United States Patent [19]
Eustacchio et al.

[11] Patent Number: 4,612,123
[45] Date of Patent: Sep. 16, 1986

[54] REGULATING APPARATUS FOR DEWATERING MACHINES

[75] Inventors: Peter Eustacchio; Heinz Perchthaler; Rupert Syrowatka, all of Graz, Austria

[73] Assignee: Maschinenfabrik Andritz Actiengesellschaft, Graz, Austria

[21] Appl. No.: 692,997

[22] Filed: Jan. 22, 1985

Related U.S. Application Data

[63] Continuation of Ser. No. 461,109, Jan. 25, 1983, abandoned.

[51] Int. Cl.[4] .............................................. B01D 33/02
[52] U.S. Cl. ..................................... 210/709; 210/739; 210/96.1; 210/101; 210/401
[58] Field of Search ............... 210/739, 740, 744, 745, 210/746, 101, 104, 400, 401, 709, 96.1

[56] References Cited

U.S. PATENT DOCUMENTS

| 3,605,775 | 9/1971 | Zaander et al. | 210/745 |
| 3,815,749 | 6/1974 | Bondarev et al. | 210/104 |
| 4,198,298 | 4/1980 | Zuckerman | 210/759 |
| 4,226,714 | 10/1980 | Furness et al. | 210/740 |
| 4,267,060 | 5/1981 | Miller | 210/103 X |
| 4,336,143 | 6/1982 | Abbott | 210/740 |
| 4,341,628 | 7/1982 | Fujinami et al. | 210/401 X |

Primary Examiner—John Adee
Attorney, Agent, or Firm—Frost & Jacobs

[57] ABSTRACT

This invention relates to an improvement in a regulating apparatus for a dewatering machine, in particular a double strainer dewatering machine (sieve belt press), with one or more control circuits, for instance a flocculant control circuit and/or a flow rate control circuit, or a straining rate control circuit, to adapt to sludges or suspensions with varying dewatering properties, the improvement comprising means employing the rate of freely draining filtrate in the strainer zone as the criterion value for the flocculant control circuit.

13 Claims, 2 Drawing Figures

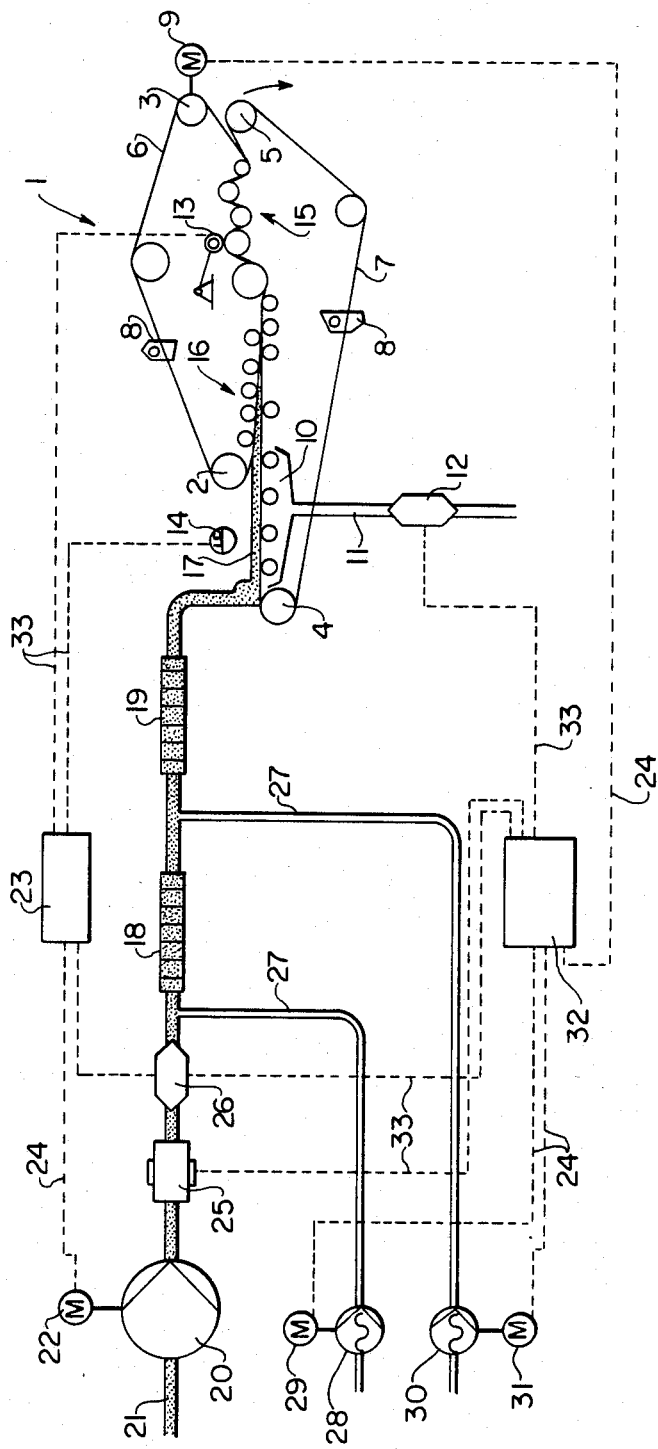
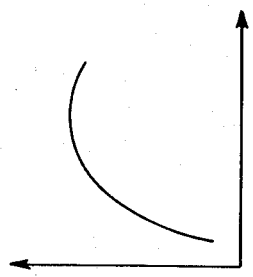
FIG. 1
FIG. 2

REGULATING APPARATUS FOR DEWATERING MACHINES

This application is a continuation of application Ser. No. 461,109, filed Jan. 25, 1983, now abandoned.

This invention relates to a regulating apparatus for dewatering machines, in particular a double strainer dewatering machine (strainer belt press), with one or more control circuits such as a flocculant control circuit and/or a flow rate control circuit, or a straining rate control circuit to adapt to sludges or suspensions of varying dewatering characteristics.

Austrian Patent No. 357,118, discloses a double strainer sludge dewatering machine provided with a regulating means composed of a flocculant regulating circuit, a flow rate regulating circuit and a straining rate regulating circuit. The water content of the pressed out sludge and the related cake spreading is used therein as the measure for the amount of flocculant to be added, the sludge level in the straining zone is used as the measure for charging raw material into the machine, and the dewatering rate is used to vary the straining rate.

This otherwise quite useful regulation however has the drawback that for certain sludges the cake spreading varies impulsively with the amount of flocculant, and accordingly there is no continuous regulatory behavior.

This being the state of the art, it is the object of the present invention to provide an apparatus to control a dewatering machine, in particular a double strainer dewatering machine, for which the regulation responds essentially in the manner of fine control, and wherein, moreover, this regulation also responds to changes in the suspension during the dewatering process by means of a flocculant control circuit and/or a flow rate control circuit, or a straining rate control circuit.

This object is attained by the invention in that the rate of freely draining filtrate of the strainer zone is used as the control value for the flocculant control circuit. For accessories such as a flow rate control circuit, used as the control for charging raw material. If use is made of the straining rate control circuit, the straining rate is determined in a known tachometric manner as a To optimize the input of flocculant, a further design of function of the desired rate of freely draining filtrate. the invention regulates in iterative manner to maximize the rate of free drainage of the filtrate.

The invention is discussed in further detail below in relation to an illustrative embodiment.

FIG. 1 shows a regulating apparatus for a double strainer sludge dewatering machine, and FIG. 2 is a graph of the flocculant rate.

FIG. 1 schematically shows the arrangement of the regulating apparatus for the double strainer sludge dewatering machine. The double strainer belt press 1 is of known design. A reversing roller 2 and 3 is mounted at each end of the press and guides the upper strainer belt 6, while the lower strainer belt 7 is tensioned by means of the reversing rollers 4 and 5. The reversing roller 2 furthermore acts as a drive roller powered by a tachometrically controlled motor 9. The material to be dewatered is passed between the two strainer belts 6 and 7, the special roller arrangement resulting in the wedging section 16 and the pressing section 15, with several S-shaped reversals. Moreover each strainer 6 and 7 is provided with a strainer cleaning means 8. The reversing roller 4 is advanced to such an extent that the material feed 17 is suitable for gravitation dewatering in the strainer zone. A collecting pan 10 for the filtrate is mounted underneath. The drain line 11 is mounted at the lowest point of the uneven collecting pan 10. The drain line 11 leads to a flow rate meter 12, the operation of which will be discussed further below. A cake thickness meter 13 is mounted at the top side of a pressing roller where this roller is enveloped by the two strainers 6, 7.

The suspension to be dewatered arrives through the feed line 21 at the sludge pump 20. This sludge pump 20 is of such a design that a variable flow rate is possible. The sludge pump 20 is powered by a drive motor 22 connected to the control line 24.

A consistency meter 25 determining the solid content is mounted downstream of the sludge pump 20. This consistency meter 25 is connected by the control line 33 to a control device 32. Further, a flow rate meter 26 is connected to the feed line 21 and communicates on one hand with the control device 32 and on the other hand with a control device 23 for the suspension flow rate.

A mixer 18 for sludge flocculants is inserted in the feed line 21 supplying the suspension to the double belt press 1. The flocculant is fed through the flocculant line 27, the flocculant solution being moved by a pump 28 powered by a tachometrically controlled drive 29. Moreover, an additional mixer 19 is provided which is also supplied with a solution of flocculant by a flocculant line 27 through the associated pump 30 and drive 31. Both drives 29 and 30 are connected by means of the control line 24 to the control device 32, which is also connected to the drive motor 9 of the double belt press 1.

Accordingly, the control 32 determining the dosing of the flocculant depends on the consistency meter 25 and the flow rate meter 26 as well as on the flow rate meter 12 through the control line 33. The drives 9, 29, and 31 are controlled in this manner. The control 23 is provided for the flow of the suspension and in turn is connected by the control line 33 with the meter 14 for the sludge level or the meter 13 for the cake thickness and with the flow rate meter 26, which controls the drive motor 22 for the sludge pump.

FIG. 2 is a graph with the filtrate in $m^3/h$ as the ordinate and the flocculant rate in $m^3/h$ as the abscissa. The curve shows the relation between the rate of flocculant fed to a sludge of constant quantity and constant solids content and the filtrate obtained when dewatering this sludge in a strainer belt press. It is seen that at first an increase in the flocculant feed results in an increase in the filtrate. However, beyond a given rate of flocculant dependent on the sludge this increase in flocculant results in a lesser increase in the rate of filtrate and lastly in a drop in the rate of filtrate. This known effect is industrially called over-flocculation and use is made thereof in the present invention.

It is essential to use the freely draining filtrate in the strainer zone as the control value for the flocculant regulating circuit. The supply of flocculant or of several flocculants is optimized in this process, the rate of the freely draining filtrate being constrained to follow the maximum value or, if appropriate, a predetermined value, this value being approached by iteration. If the solid content of the suspension varies along a curve predetermined by the material characteristic and shown in basic form in FIG. 2, then the henceforth optimal supply of flocculant will be readjusted proportionally. Where several flocculants are used, the proportion of the supplied quantity is so changed that again the rate of the freely draining filtrate tends toward the maximum value.

If a further control circuit is used, for instance the flow rate control circuit, then use is made of the sludge level in the strainer zone, measured by the meter 14, or of the cake thickness, measured by the cake thickness meter 13, as the measure of raw material input.

Again, when the control circuit for the straining rate is used, the tachometrically controlled drive (motor 9) is regulated as a function of the rate of the desired freely draining filtrate.

This regulating apparatus therefore makes it possible to dewater even a constantly varying suspension and to achieve a given operational state, for instance the maximum system flow rate. The adjustment takes place very rapidly and without manual intervention, each of the cited control circuits being applicable individually, although the combination with the remaining control circuits also is appropriate to attain the desired goal.

It will be obvious to those skilled in the art that many modifications may be made within the scope of the present invention without departing from the spirit thereof, and the invention includes all such modifications.

What we claim is:

1. In a process for regulating a dewatering machine, in particular a double strainer sieve belt press having a strainer zone, a wedging section, a press section, means for introducing at least one flocculant in advance of said strainer zone, and a flocculant control circuit for adaption to sludges or solids-containing suspensions with varying dewatering properties, the improvement comprising the step of using the amount of sludge supplied to the strainer zone, its consistency and the amount of freely draining filtrate in said strainer zone as a control input for said flocculant control circuit.

2. The improvement according to claim 1, including the step of using one of sludge level in said strainer zone and cake thickness in said press section as a measure for the addition of raw material.

3. The improvement according to claim 2, wherein straining rate is maintained as a function of the desired amount of freely flowing filtrate by means of a tachometrically adjustable drive means.

4. The improvement according to claim 1, including the step of so optimizing the amount of flocculant added when using at least one flocculant that the flow rate of freely draining filtrate tends toward one of a maximum value and predetermined value.

5. The improvement according to claim 4, including the step of iterative approach to maximizing the flow rate of freely flowing filtrate drainage.

6. The improvement according to claim 5, including the step of adjusting a particular optimum rate of flocculant upon a change in the solids content of the suspension.

7. The improvement according to claim 4, including the step of so varying the proportions of the amount of flocculants added when using more than one flocculant that the flow rate of the freely draining filtrate tends toward one of said maximum value and said predetermined value.

8. The improvement according to claim 1, including the step of maintaining the sludge level in said straining zone at a given value for constant cake thickness in said press section.

9. In a dewatering machine, in particular a double strainer sieve belt press having a strainer zone, a wedging section, a press section, means for introducing at least one flocculant in advance of said strainer zone, and a flocculant control circuit for adaptation to sludges or solids-containing suspensions with varying dewatering properties, the improvement wherein said control circuit regulating the amount of flocculant to be added to the sludge includes a flow rate meter for the sludge supplied to the strainer zone, a consistency meter for the sludge supplied to the strainer zone, and a flow meter determining the flow rate of filtrate accumulating in the strainer zone.

10. The improvement according to claim 1, wherein said press comprises upper and lower filter belts for carrying the sludge or suspension to be dewatered, and rollers for guiding said belts, the lower belt passing through said strainer zone in advance of said wedging section.

11. The improvement according to claim 10, wherein a front roller of the lower filter belt is disposed so gas in advance in relation to a front roller of the upper filter belt that said strainer zone is suitable for gravity dewatering.

12. The improvement according to claim 10, including a motor driving the filter belts, said motor being connected to said control circuit regulating the amount of flocculant to be added to the sludge for regulating the speed of said motor.

13. The improvement according to claim 9, including a sludge level metering device in said strainer zone and a cake thickness metering device in said press section for regulating the amount of sludge supplied to said strainer zone.

* * * * *